United States Patent
Mayer et al.

(10) Patent No.: US 12,526,074 B2
(45) Date of Patent: Jan. 13, 2026

(54) CYCLIC REDUNDANCY CHECK FOR A COMMUNICATION METHOD

(71) Applicant: Hilti Aktiengesellschaft, Schaan (LI)

(72) Inventors: Stefan Mayer, Fensterbach (DE); Klaus Hauser, Schwabmuenchen (DE); David Koscheck, Lamdsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 7 days.

(21) Appl. No.: 18/704,027

(22) PCT Filed: Nov. 9, 2022

(86) PCT No.: PCT/EP2022/081282
§ 371 (c)(1),
(2) Date: Apr. 23, 2024

(87) PCT Pub. No.: WO2023/088750
PCT Pub. Date: May 25, 2023

(65) Prior Publication Data
US 2024/0413930 A1  Dec. 12, 2024

(30) Foreign Application Priority Data
Nov. 22, 2021 (EP) .................... 21209638

(51) Int. Cl.
| H04L 1/00 | (2006.01) |
| B25B 21/00 | (2006.01) |
| B25F 5/00 | (2006.01) |

(52) U.S. Cl.
CPC .............. *H04L 1/0061* (2013.01); *B25F 5/00* (2013.01); *B25B 21/00* (2013.01)

(58) Field of Classification Search
CPC ........... H04L 1/0061; B25F 5/00; B25B 21/00
See application file for complete search history.

(56) References Cited

U.S. PATENT DOCUMENTS

| 6,643,815 B1 * | 11/2003 | Davis ...................... H04L 69/04 |
| | | 370/503 |
| 10,345,375 B2 * | 7/2019 | Dong ................. G01R 31/3172 |

(Continued)

FOREIGN PATENT DOCUMENTS

| WO | WO 2013014914 A2 | 1/2013 |
| WO | WO 2013063507 A1 | 5/2013 |

(Continued)

OTHER PUBLICATIONS

C.-C. Huang and C.-L. Lin, "Wireless Power and Bidirectional Data Transfer Scheme for Battery Charger," in IEEE Transactions on Power Electronics, vol. 33, No. 6, pp. 4679-4689, Jun. 2018 (Year: 2018).*

(Continued)

*Primary Examiner* — Cynthia Britt
(74) *Attorney, Agent, or Firm* — Davidson Kappel LLC

(57) ABSTRACT

Method of transmitting a first signal from the first transceiver to the second transceiver, transmitting a second signal if, after determining a checksum, no error can be detected in a first component; transmitting the first signal from the first transceiver to the second transceiver if no second signal has been received by the first transceiver after expiry of a first predetermined period; adjusting the first participant from a first operating state to a second operating state if no first signal is received after a second predetermined period or if no second signal is received after a third predetermined period; or transmitting a fourth signal from the first transceiver to the second transceiver in order to adjust the second participant from a first operating state to a second operating state if no first signal is received by the second transceiver after a second predetermined period or if no second signal is received by the first transceiver after a third predetermined period of time.

13 Claims, 5 Drawing Sheets

(56) References Cited

U.S. PATENT DOCUMENTS

| | | | |
|---|---|---|---|
| 2013/0109375 A1* | 5/2013 | Zeiler | G01S 19/16 |
| | | | 455/552.1 |
| 2014/0151079 A1* | 6/2014 | Furui | B25F 5/02 |
| | | | 173/171 |
| 2016/0311094 A1* | 10/2016 | Mergener | B25B 23/1475 |
| 2016/0325391 A1* | 11/2016 | Stampfl | B25B 21/00 |
| 2020/0136754 A1* | 4/2020 | Hoermaier | H04L 1/0041 |
| 2022/0052872 A1* | 2/2022 | Hofer | H04L 12/40169 |

FOREIGN PATENT DOCUMENTS

| | | |
|---|---|---|
| WO | WO 2015061370 A1 | 4/2015 |
| WO | WO 2016179271 A1 | 11/2016 |

OTHER PUBLICATIONS

International Search Report PCT/EP2022/081282 dated Mar. 14, 2023.

\* cited by examiner

CYCLIC REDUNDANCY CHECK FOR A COMMUNICATION METHOD

The present invention relates to a method for communicating between a first participant with a first transceiver and a second participant with a second transceiver, wherein the first participant is in the form of a rechargeable battery, for example, and the second participant is in the form of a power tool or a charging apparatus, for example, and wherein the rechargeable battery can be selectively releasably connected to the power tool or charging apparatus.

Furthermore, the present invention relates to a system for carrying out a method for communicating between a first and a second participant.

BACKGROUND

In order to supply an electrically operated power tool with electrical energy, a rechargeable battery or a plurality of rechargeable batteries is/are often releasably connected to the power tool so that the energy storage cells (also called rechargeable battery cells) arranged inside the rechargeable battery can deliver stored electrical energy to relevant loads of the power tool. The loads can be the drive of the power tool, a control apparatus, an additional unit (such as a lamp) or the like. An apparatus for a connection of this type between the power tool and the rechargeable battery consists of both mechanical attachment components and electrical connecting terminals. Such a connection apparatus is in this case in the form of an interface or interface apparatus arranged on the power tool and in the form of a corresponding interface or interface apparatus arranged on the rechargeable battery.

The corresponding electrical connecting terminals of both the power tool and the rechargeable battery are provided usually as releasable plug-in connections in the respective positive and negative paths of the electrical energy supply so that the positive and negative contacts of the rechargeable battery are thereby connected to the corresponding positive and negative contacts of the loads of the power tool.

The mechanical components may be in the form of a rail system or a plug-in connection, for example, by means of which it is possible to slide the rechargeable battery onto the connection apparatus on the power tool, which connection apparatus is embodied as an interface, and also to remove said rechargeable battery again. Sliding the rechargeable battery onto the power tool causes the connecting terminals (i.e. the corresponding positive and negative contacts) of the rechargeable battery to connect to the corresponding connecting terminals of the power tool, so that the electrical energy stored in the rechargeable battery can reach the loads of the power tool.

In addition to the mechanical attachment components and the electrical connecting terminals, the connection apparatus often also has a data connection between the power tool and the rechargeable battery. The data connection is used in this case to transmit or exchange data and information in the form of electrical signals between the power tool and the rechargeable battery. In order to transmit or exchange signals, the data connection has a transceiver on the power tool side and a corresponding transceiver on the rechargeable battery side. Each transceiver is able to receive and transmit signals.

The data and information that can be sent from the rechargeable battery to the power tool, for example, can include the SOC (state of charge) or SOH (state of health) of the rechargeable battery, for example.

The data and information that can be sent from the power tool to the rechargeable battery, for example, can include the value of the electrical voltage or current intensity.

SUMMARY OF THE INVENTION

An exact and, above all, reliable connection between the power tool and the rechargeable battery often poses a certain challenge, with a hard application area characterized by numerous mechanical loads representing an additional challenge for the connection, in particular.

On the one hand, the mechanical components and the electrical connecting terminals must be designed to ensure relatively simple handling so that attaching the rechargeable battery to the power tool, and also removing it again, is as straightforward as possible.

On the other hand, the mechanical components and electrical connecting terminals must be relatively robust so that they can withstand the movements, vibrations and shaking during use of the power tool with the connected rechargeable battery.

Even a brief or temporary interruption in the connection between the power tool and the rechargeable battery is generally undesirable and should be avoided.

An interruption in the connection can lead to an intermittent supply of electrical energy to the power tool from the rechargeable battery, with the result that the electric motor of the power tool no longer rotates steadily and/or rotates only at a lower speed. This can lead in turn, for example, to power fluctuations at the electric motor, causing the electric motor to generate an unsteady torque or merely too low a torque. Fluctuations in power or rotational speed that generate a lower torque output from the electric motor ultimately lead to the power tool working inefficiently.

In addition, an interruption of this type in the energy supply can also indicate a malfunction of the rechargeable battery. It is always necessary to pay attention to malfunctions of the rechargeable battery, as these may ultimately lead to complete breakdown or total failure of the rechargeable battery.

An interruption in the connection between the power tool and the rechargeable battery can also lead to a disruption or complete interruption in the transmission of data. This can lead to malfunctions or faults in the power tool and/or in the rechargeable battery.

An object of the present invention is therefore to solve the problem described above and to detect as early as possible and reliably whether there is a fault in the connection between the power tool and the rechargeable battery, which can lead to an undesirable malfunction. In addition, appropriate measures should be taken in order to set a safe state on the power tool and/or on the rechargeable battery.

The present invention provides a method for communicating between a first participant with a first transceiver and a second participant with a second transceiver, wherein the first participant is in the form of a rechargeable battery, for example, and the second participant is in the form of a power tool or a charging apparatus, for example, and wherein the rechargeable battery can be selectively releasably connected to the power tool or charging apparatus.

According to the invention, the method comprises the method steps of transmitting at least one first signal from the first transceiver to the second transceiver, wherein the signal contains at least one first component of a data set and one second component of a data set;

transmitting a second signal from the second transceiver to the first transceiver if, after determining a checksum, no error can be detected in the first component of the first transmitted and received signal;

transmitting the first signal from the first transceiver to the second transceiver if no second signal is received by the first transceiver after expiry of a first predetermined period of time;

adjusting the first participant from a first operating state to a second operating state if no first signal is received by the second transceiver after a second predetermined period of time or if no second signal is received by the first transceiver after a third predetermined period of time; and/or transmitting a third signal from the first transceiver to the second transceiver in order to adjust the second participant from a first operating state to a second operating state if no first signal is received by the second transceiver after a second predetermined period of time or if no second signal is received by the first transceiver after a third predetermined period of time.

By means of the checksum to be determined (also called the check value), any errors that may occur during signal transmission can be detected.

The first and/or second transceiver can also be referred to as a communication module or transceiver.

The second signal can also be referred to as a confirmation signal or acknowledgment signal and is used to confirm to the first participant that, after determining a checksum, no error can be detected in the first component of the first signal.

It should be noted that if, after expiry of a first predetermined period of time, no second signal is received by the first transceiver, the first signal is retransmitted from the first participant to the second participant. The retransmitted first signal is identical to the first signal which has already and previously been transmitted from the first participant to the second participant.

The first operating state can be an activation mode or activation state and the second operating state can be a deactivation mode or deactivation state. Alternatively, the first operating state may be a state or mode of a participant in which a number of functions are activated. In contrast, the second operating state can be a state or mode of a participant in which a smaller number of functions are activated than in the first operating state.

According to an advantageous embodiment of the present invention, the following method step may be included: storing the number of signals received by the second transceiver for which an error can be detected in the first component of the first transmitted and received signal when a checksum is determined.

Such signals can be stored by means of the storage device. The storage device can be part of a control unit of one of the participants. Furthermore, a storage device can also be part of a control unit of a further participant.

According to an alternative embodiment, it may be possible for the first participant to be adjusted from a first operating state to a second operating state only after a predetermined number of signals received by the second transceiver, for which an error can be detected in the first component of the first signal after determining a checksum, and the failure of the first transceiver to receive the second signal after a predetermined fourth period of time.

As an alternative or in addition to this, the second participant can also be adjusted from a first operating state to a second operating state by transmitting a corresponding signal from the first participant to the second participant.

According to an advantageous embodiment of the present invention, it may be possible to use a cyclic redundancy check to determine a checksum.

According to an advantageous embodiment of the present invention, it may be possible for the first component of the data set to be in the form of useful data and for the second component of the data set to be in the form of redundancy.

In this case, the useful data can also only be referred to as data. The redundancy can also be referred to as a CRC value, i.e. cyclic redundancy check value, or as check bits.

According to a further advantageous embodiment of the present invention, it may be possible for the first operating state to be an activation mode and for the second operating state to be a deactivation mode.

The activation mode of the power tool or the rechargeable battery is a state in which at least one function of the power tool or the rechargeable battery is activated. The at least one function of the power tool may be running a drive of the power tool in order to generate a torque.

In addition, the at least one function of the rechargeable battery may be providing the electrical energy stored in the rechargeable battery.

The deactivation mode of the power tool or the rechargeable battery is a state in which all functions of the power tool or the rechargeable battery are deactivated. As a result of all functions of the power tool being deactivated, the running of the drive of the power tool in order to generate a torque is also interrupted at least temporarily or permanently, for example. The deactivation of all functions of the rechargeable battery leads to an at least temporary or permanent interruption in providing the electrical energy stored in the rechargeable battery.

The communication between the power tool and the rechargeable battery may be bidirectional communication or else monodirectional or unidirectional communication. In the case of bidirectional communication, it is possible to exchange signals, data and information between the power tool and the rechargeable battery. In the case of monodirectional or unidirectional communication, in contrast, signals, data and information are sent solely from the rechargeable battery to the power tool, or from the power tool to the rechargeable battery.

According to an advantageous embodiment of the present invention, it may be possible that there is included the method step of:

transmitting a signal containing a synchronization pattern from the first transceiver to the second transceiver in order to adjust the transmission rate for the communication between the at least first and second transceiver.

The transmission rate for the communication between the at least first and second transceiver can also be referred to as the "baud rate".

Furthermore, the present invention provides a system for carrying out the method according to the invention for communicating between a first and a second participant, wherein the first participant contains a control unit and at least one first transceiver and the second participant contains a control unit and at least one second transceiver, wherein signals can be transmitted between the first and second transceivers in a connected state.

According to an advantageous embodiment of the present invention, it may be possible for the communication between the first and second participants to be based on a wireless data transmission technology.

The wireless data transmission technology can be Bluetooth, WLAN, ZigBee, NFC (near field communication), Wibree or WiMAX in the radio frequency band and also IrDA (infrared data association), FSO (free-space optical communication) and Li-Fi (light fidelity) in the infrared and optical frequency bands.

The wireless data transmission technology makes it possible to exchange data even when the first and second participants in the communication are not in direct contact or are not physically connected to one another.

According to a further advantageous embodiment of the present invention, it may be possible for the communication between the first and second participants to be based on a wired data transmission technology. This ensures relatively robust and largely interference-free data exchange.

According to a further advantageous embodiment of the present invention, it may be possible for the first participant to be in the form of a rechargeable battery and for the second participant to be in the form of a power tool supplied with electrical energy by the rechargeable battery.

According to a further advantageous embodiment of the present invention, it may be possible for the first participant to be in the form of a rechargeable battery and for the second participant to be in the form of a charging apparatus for supplying the rechargeable battery with electrical energy.

Furthermore, according to a further advantageous embodiment of the present invention it may be possible for the first participant to be in the form of a first rechargeable battery and for the second participant to be in the form of a second rechargeable battery.

Alternatively, the first participant can be a first power tool and the second participant can be a second power tool.

BRIEF DESCRIPTION OF DRAWINGS

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

Identical and similar components are denoted by the same reference signs in the figures, in which.

DETAILED DESCRIPTION

Figure 1:
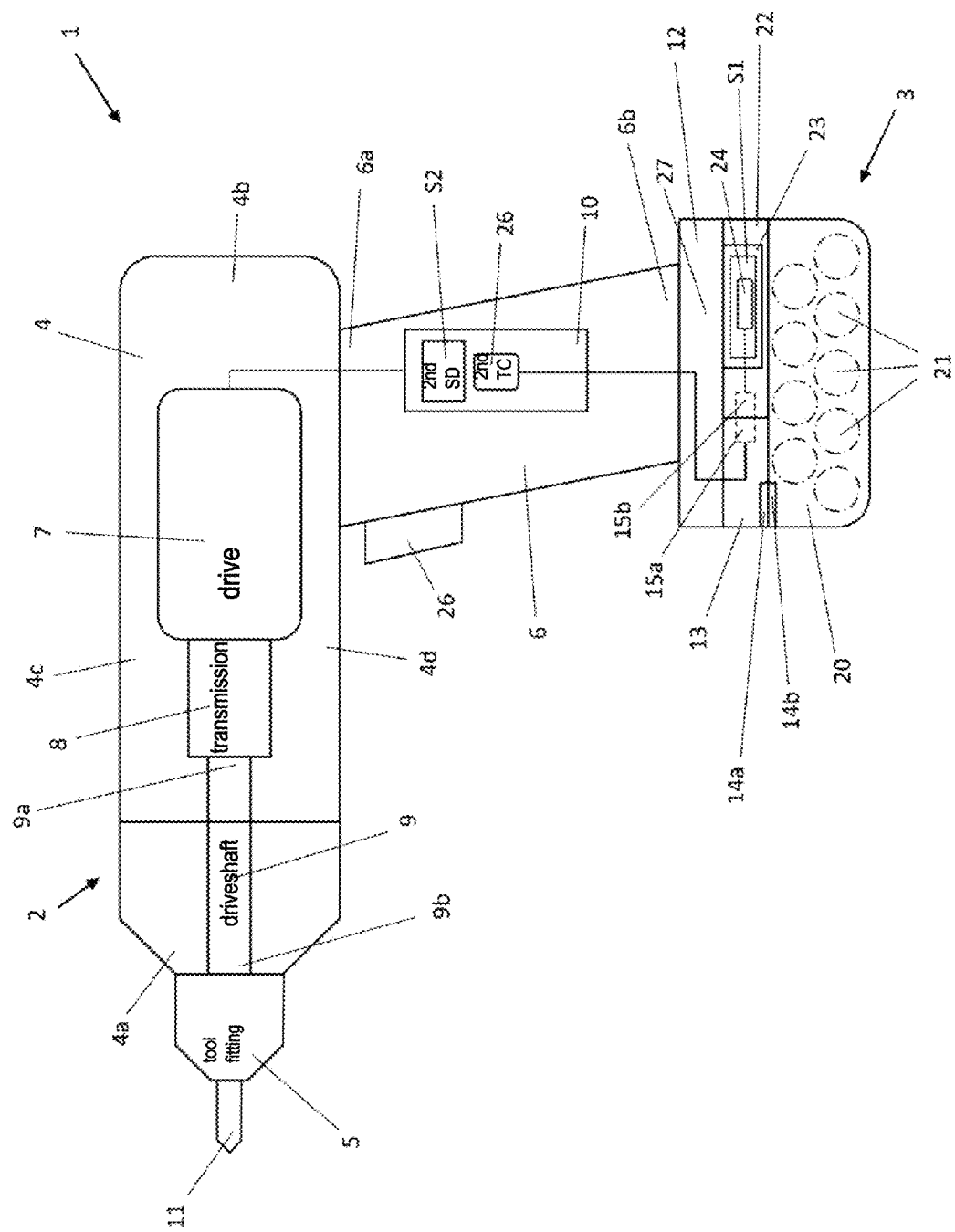
FIG. 1 shows a schematic side view of a system according to the invention having a power tool and a rechargeable battery which is connected to the power tool.

A preferred exemplary embodiment of a system 1 according to the invention having a power tool 2 and a rechargeable battery 3 which is connected to the power tool 2 is illustrated in FIG. 1. The rechargeable battery 3 is releasably connected to the power tool 2 and is used to supply the power tool 2 with electrical energy.

In the present exemplary embodiment, the power tool 2 is in the form of a rechargeable battery-operated screwdriver. According to an alternative embodiment, the power tool 2 can also be in the form of a hammer drill, a drill, a saw, a grinder or the like.

The power tool 2 mainly comprises a housing 4, a tool fitting 5 and a handle 6.

The housing 4 of the power tool 2 in turn comprises a front end 4a, a rear end 4b, a top side 4c and an underside 4d. As FIG. 1 indicates, positioned inside the housing 4 is a drive 7, a transmission apparatus 8, an output shaft 9 and a control unit 10. In addition, a first storage device S1 is provided and is used to store and provide information and data.

The drive 7 is in this case in the form of a brushless electric motor. Alternatively, the drive 7 can also be in the form of an electric motor with carbon brushes.

The drive 7 in the form of a brushless electric motor serves to generate a torque. The drive 7 is connected to the transmission apparatus 8 in such a way that the torque generated by the drive 7 is transferred to the transmission apparatus 8. The driveshaft 9 includes a first end 9a and a second end 9b. The transmission apparatus 8 is in turn connected to the first end 9a of the driveshaft 9 so that the torque generated by the drive 7 is transferred to the driveshaft 9. The second end 9b of the driveshaft 9 is connected to the tool fitting 5 in such a way that the torque of the driveshaft 9 is transferred to the tool fitting 5. The tool fitting 5 serves to receive and hold a tool 11. In the present exemplary embodiment, the tool 11 is in the form of a screwdriver bit. By means of the torque transferred to the tool fitting 11, the torque is finally transferred to the tool 11 in the form of a screwdriver bit.

The handle 6 comprises a first end 6a and a second end 6b, and is used by a user to hold and guide the power tool 2. The first end 6a of the handle 6 is arranged on the underside 4d of the housing 4 of the power tool 2. A base apparatus 12 is connected at the second end 6b of the handle 6. At the base apparatus 12 is contained a power-tool interface 13. The power-tool interface 13 serves as a connection or connecting option for the rechargeable battery 3.

Figure 2:
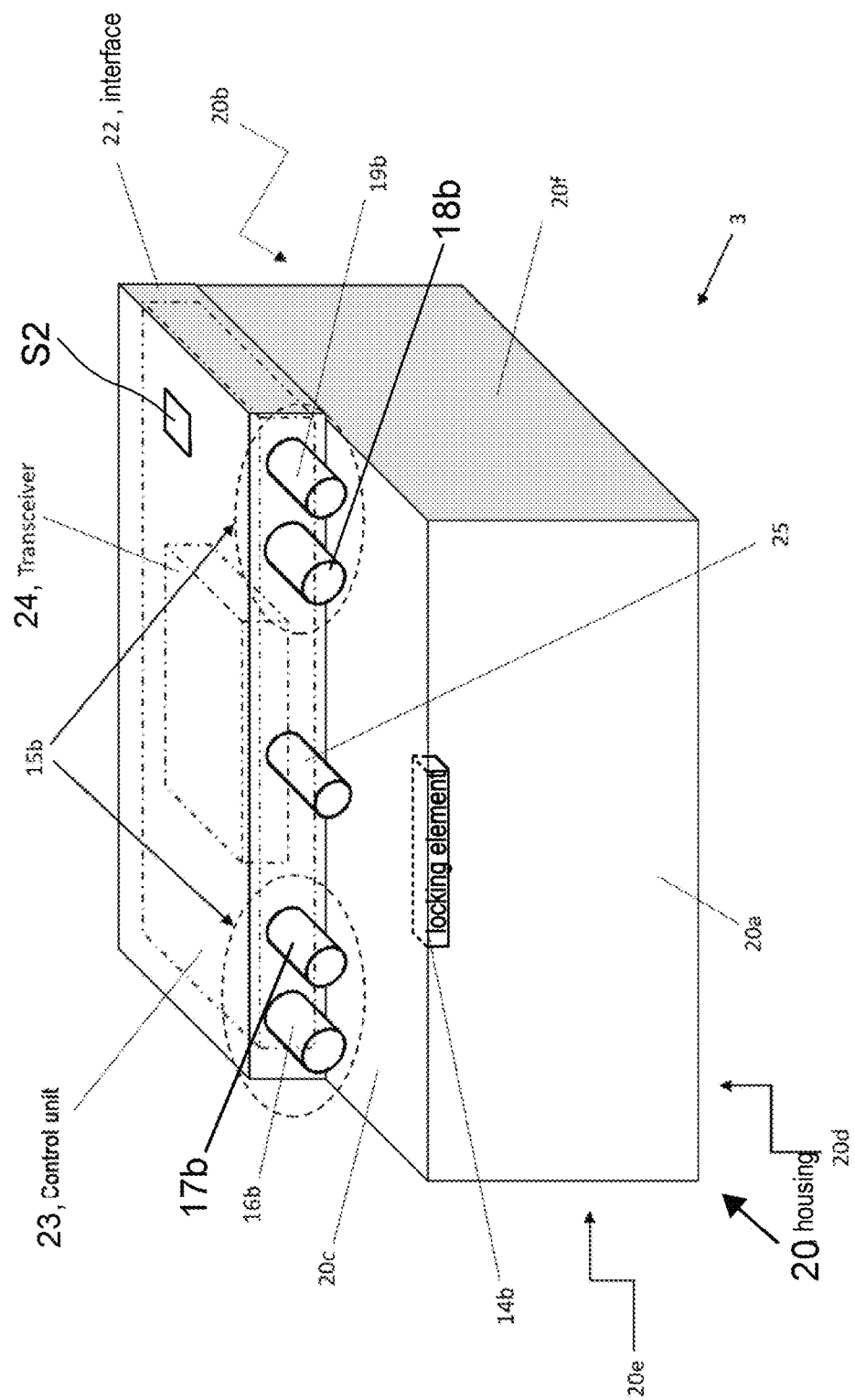
FIG. 2 shows a perspective view of the rechargeable battery with a rechargeable-battery interface.
Figure 3:
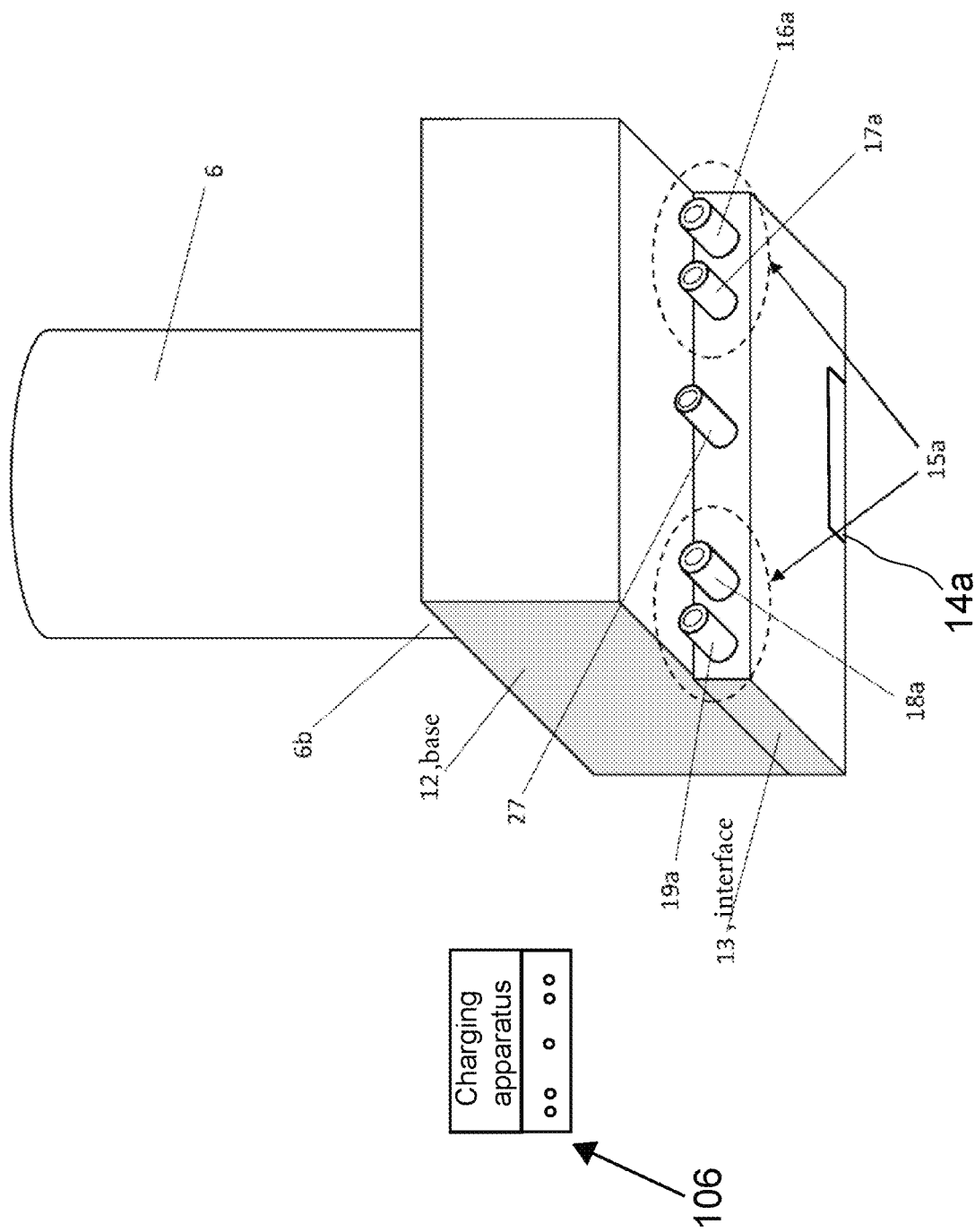
FIG. 3 shows a perspective view of a base apparatus of the power tool with a power-tool interface.

As can be seen in FIGS. 2 and 3, the power-tool interface 13 comprises a mechanical attachment component 14a and electrical connecting terminals 15a. The mechanical attachment component 14a is here in the form of a locking element. The electrical connecting terminals 15a are in turn in the form of a first and a second positive contact 16a, 17a and a first and a second negative contact 18a, 19a (see, e.g., FIG. 3). According to an alternative embodiment, it may also be possible for more or fewer than two positive contacts and more or fewer than two negative contacts to be provided on the power-tool interface 13.

A first embodiment of the rechargeable battery 3 is illustrated in FIG. 2. The rechargeable battery 3 comprises a rechargeable battery housing 20, a number of energy storage cells 21, a rechargeable-battery interface 22 and a control unit 23.

Positioned inside the rechargeable battery housing 20 are the energy storage cells 21 and the control unit 23 (see, e.g., FIG. 1). In addition, a second storage device S2 (shown solely schematically) is provided and is used to store and provide information and data.

The control unit 23 is used to control and regulate the different functions of the rechargeable battery 3. The functions of the rechargeable battery 3 include, for example, the delivery of a certain amount of electrical energy, the current intensity or the like.

The rechargeable battery housing 20 comprises a front side 20a, a rear side 20b, a top side 20c, an underside 20d, a left-hand side wall 20e and a right-hand side wall 20f. Positioned on the top side 20c is the rechargeable-battery interface 22.

The rechargeable-battery interface 22 is designed to correspond to the power-tool interface 13, so that the rechargeable-battery interface 22 and the power-tool interface 13 can be releasably connected to one another. The rechargeable-battery interface 13 comprises for this purpose likewise a mechanical attachment component 14b and electrical connecting terminals 15b. Just like with the power-tool interface 13, the mechanical attachment component 14b of the rechargeable battery 3 is in the form of a locking element.

The electrical connecting terminals 15b of the rechargeable-battery interface 22 are in turn in the form of a first and a second positive contact 16b, 17b and a first and a second negative contact 18b, 19b. According to an alternative embodiment, it may also be possible for more or fewer than two positive contacts and more or fewer than two negative contacts to be provided on the rechargeable-battery interface 13.

The locking element 14b of the rechargeable-battery interface 22 corresponds to the locking element 14a of the power-tool interface 13, with the result that the two locking elements 14a, 14b can be releasably connected to one another in a form-fitting manner. Alternatively, the two locking elements 14a, 14b can also be connected in a force-fitting manner.

According to an alternative embodiment, the mechanical attachment component attachment of the rechargeable battery 3 to the power tool 2.

As indicated in FIG. 1, the control unit 23 of the rechargeable battery 3 contains a first transceiver 24. The first transceiver 24 is used to send and receive data and information in the form of electrical signals.

Figure 5:
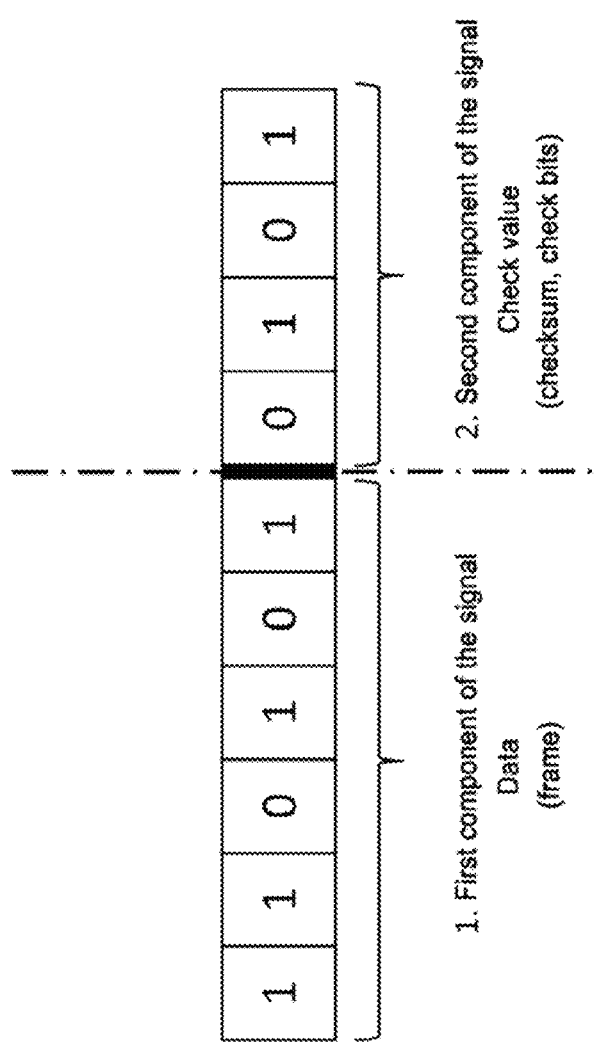
FIG. 5 shows a schematic representation of a signal with a first component of a data set and a second component of a data set.

FIG. 5 shows a schematic representation of the components of an electrical signal. The signal consists of a first component B1 and a second component B2. The first component B1 of the data set is in the form of useful data and the second component B2 of the data set is in the form of redundancy.

According to an alternative embodiment, the first transceiver 24 may also be positioned at another suitable point on the rechargeable battery 3, and be connected by a corresponding line to the control unit 23 for the purpose of exchanging signals and data.

Figure 4:
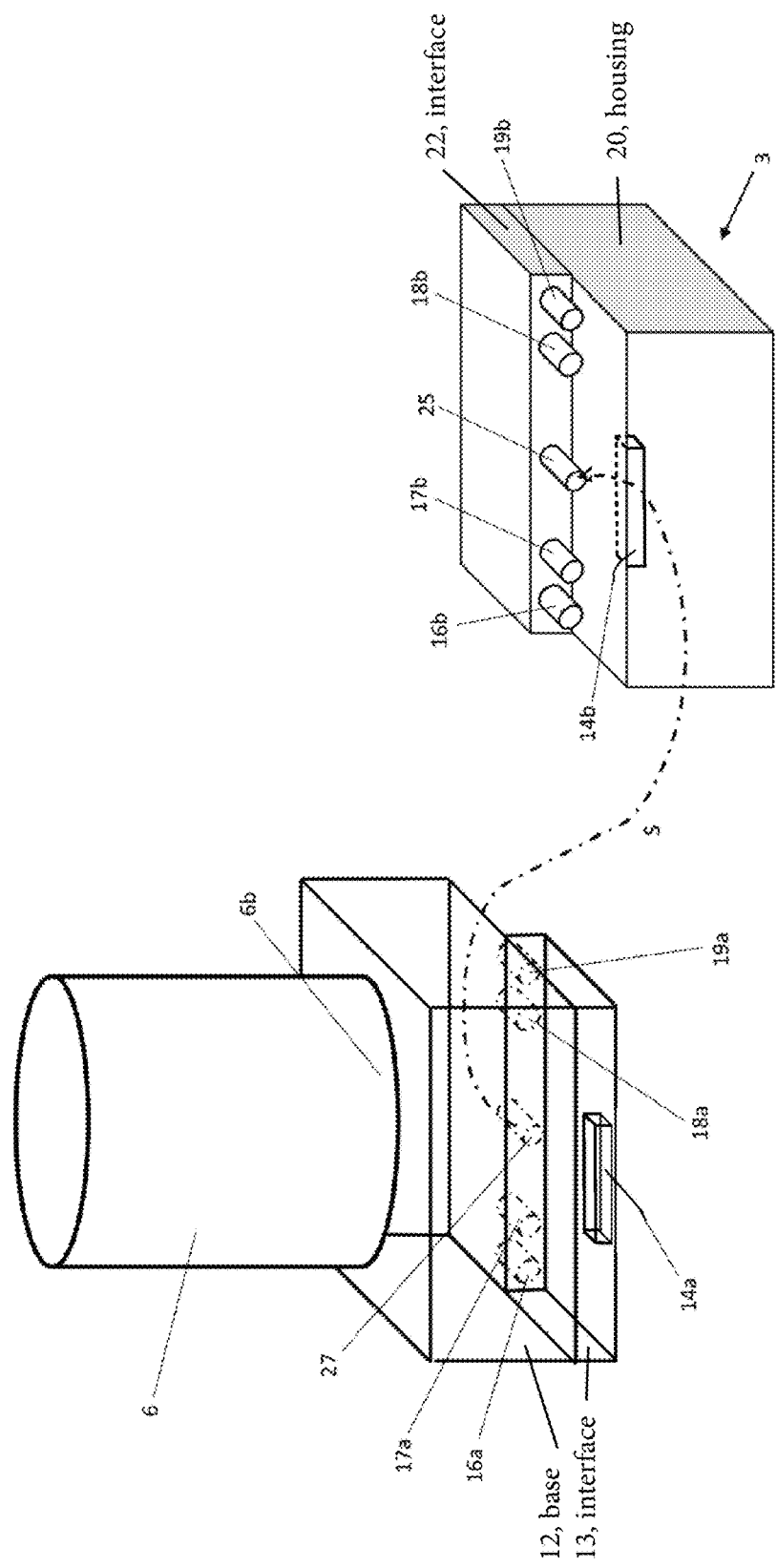
FIG. 4 shows a perspective view of a handle of the power tool together with the base apparatus and the rechargeable battery with the rechargeable-battery interface.

The rechargeable-battery interface 22 also contains a first communication element 25. As shown in FIGS. 2 and 4, the first communication element 25 is positioned between the electrical connecting terminals 15b, i.e. between the two positive contacts 16b, 17b and the two negative contacts 18b, 19b.

As FIG. 2 also shows, according to a first exemplary embodiment of the present invention, the first communication element 25 is in the form of a male connector. The first communication element 25 in the form of a male connector is in turn connected to the first transceiver 24 via a communication line. Connecting the first communication element 25 to the first transceiver 24 makes it possible to exchange signals, data and information.

The first communication element 25 essentially serves to exchange (i.e. send and receive) communication signals with another communication partner through the rechargeable battery 3.

According to a further exemplary embodiment, the first communication element 25 may also be in the form of a radio element for wireless communication or radio transmission.

As shown in FIG. 1, the power tool 2 comprises a second transceiver 26. Like the first transceiver 24, the second transceiver 26 is used to send and receive data and information in the form of electrical signals. The first and second transceivers 24, 26 are designed to correspond to one another, such that communication in the form of an exchange of signals is possible.

As FIG. 1 also indicates, the second transceiver 26 is positioned at the control unit 10 of the power tool 2. According to an alternative embodiment, the second transceiver 26 may also be positioned at another point on the power tool, and be connected by a line to the control unit for the purpose of exchanging signals and data.

As shown in FIGS. 3 and 4, the power-tool interface comprises a second communication element 27 which is positioned between the electrical connecting terminals 15a of the power-tool interface 13, i.e. between the two positive contacts 16a, 17a and the two negative contacts 18a, 19a. The second communication element 27 is connected to the second transceiver 26 via a line in such a way that signals can be exchanged between the second transceiver 26 and the second communication element 27.

As FIG. 3 likewise indicates, according to the first exemplary embodiment of the present invention, the second communication element 27 is in the form of a female connector. The second communication element 27, which is in the form of a female connector, corresponds to the first communication element 25, which is in the form of a male connector, so that the first communication element 25, which is in the form of a male connector, can make a plug-in connection to the second communication element 27, which is in the form of a female connector. By connecting the first communication element 25 to the second communication element 27, signals, data and information can be exchanged or communicated between the control unit 23 of the rechargeable battery 3 and the control unit 10 of the power tool 2. The communication between the power tool 2 and the rechargeable battery 3 may be either bidirectional communication or else unidirectional or monodirectional communication. In the case of unidirectional or monodirectional communication, only signals, data and information are sent from the control unit 23 of the rechargeable battery 3 to the control unit 10 of the power tool 2.

According to a further exemplary embodiment, the second communication element 17 can also be in the form of a radio element for wireless communication or radio transmission.

For the exemplary embodiment in which both the first and the second communication element 27 are in the form of a radio element for wireless communication or radio transmission, the exchange of signals, data and information from the control unit 23 of the rechargeable battery 3 to the control unit 10 of the power tool 2 takes place in the form of a radio link. The radio link may be Bluetooth, WLAN, ZigBee, NFC (near field communication), Wibree or WiMAX in the radio frequency band and also IrDA (infrared data association), FSO (free-space optical communication) and Li-Fi (light fidelity) in the infrared and optical frequency bands.

FIG. 1 shows the system 1 with the power tool 2 and the rechargeable battery 3 in a connected state, in which the rechargeable battery 3 as the energy supply is releasably connected through the power-tool interface 13 to the rechargeable-battery interface 22 of the power tool 2. In this state, both the respective positive contacts 16a, 16b, 17a, 17b and negative contacts 18a, 18b, 19a, 19b and the first and second communication elements 25, 27 are connected to one another. If both the power tool 2 and the rechargeable battery 3 are in an activation mode (also an activation state or operating state), electrical energy from the rechargeable battery 3 can reach the power tool 2, for instance as a function of the rechargeable battery 3. Furthermore, for instance as a function of the power tool 2, the drive in the form of an electric motor can rotate and thereby generate a torque.

In order to carry out the method for communicating between a first participant and a second participant, the rechargeable battery 3 and the power tool 2 are in a connected state.

The rechargeable battery 3 is the first participant and the power tool 2 is the second participant in the communication method. Alternatively, a charging apparatus can be implemented as a second participant in the communication method.

A signal is generated by means of the first transceiver 24 and is sent to the first communication element 25. The signal can be, for example, the state of charge (SoC) of the energy storage cells 21. The first communication element 25 in turn forwards the signal to the second communication element 27. From the second communication element 27, the signal reaches the second transceiver 26 via the line. The second transceiver 26 finally forwards the received signal to the control unit 10 of the power tool 2. The control unit 10 can use the information contained in the signal to retain or accordingly modify one or more functions of the power tool 2.

The control unit of the rechargeable battery 3 controls, for example, the type and number of signals and the frequency at which the signals are transmitted. For example, a relatively simple monitoring signal can be sent at regular intervals from the first transceiver 24 of the rechargeable battery 3 to the second transceiver 26 of the power tool 2 in order to indicate to the power tool 2 that the rechargeable battery 3 is still in a functional state, for example.

The signal sent by the first transceiver 24 contains a first component B1 of a data set and a second component B2 of a data set. The first component B1 of the data set is in the form of useful data and the second component B2 of the data set is in the form of redundancy.

In order to check whether signals transmitted by the first transceiver 24 of the rechargeable battery 3 and received by the second transceiver 26 of the power tool 2 are error-free and/or complete, the control unit 10 of the power tool 2 is used to determine a checksum for the received signal. A cyclic redundancy check is used to determine the checksum.

If the signal received by the second transceiver 26 is evaluated as error-free and complete as a result of the determination of the checksum, the control unit 10 of the power tool 2 can retain the operating mode of the power tool 2 unchanged. The operating mode can be, for example, the generation of a specific torque by the drive 7 at a predetermined speed. Alternatively, the operating mode of the power tool 2 can be changed or adapted by the signal received by the second transceiver 26 in an error-free and complete manner. For example, the operating mode of the power tool 2 can be changed in such a way that the speed of the drive 7 of the power tool 2 is reduced by a certain amount on the basis of the signal received, or only a lower maximum speed for the drive 7 than before will be permissible.

Furthermore, the second transceiver 26 of the power tool 2 sends a second signal to the first transceiver 24 of the rechargeable battery 3 when the signal received by the second transceiver 26 has been evaluated as error-free and complete. The second signal serves as a confirmation signal or acknowledgment signal (or also referred to as a confirmation message or acknowledgment message), which confirms to the first participant that, after a checksum has been determined, no error can be detected in the first component B1 of the first signal and the signal has been transmitted correctly and completely. Based on this second signal, the first transceiver 24 of the rechargeable battery 3 is informed that the sent signal was received by the second transceiver 26 of the power tool 2 in an error-free and complete manner. A repeated transmission of the first signal from the first to the second transceiver 24, 26 is therefore not necessary.

However, if, as a result of the checksum being determined, the signal received by the second transceiver 26 is evaluated as erroneous and/or incomplete, the signal received as erroneous and/or incomplete is stored in a storage device of the power tool 2.

Furthermore, no second signal is sent as a confirmation signal or acknowledgment signal from the second transceiver 26 to the first transceiver 24. If, after a predetermined second period of time, no second signal is sent as a confirmation signal or acknowledgment signal from the second transceiver 26 to the first transceiver 24 of the rechargeable battery 3, the first transceiver 24 resends a first signal to the second transceiver 26 of the power tool 2. The first signal that is resent is identical to the first signal that was previously sent erroneously and/or incompletely from the first transceiver 24 to the second transceiver 26. If the first signal was received in an error-free and complete manner by the second transceiver 26 this time, the second transceiver 26 now sends a second signal as a confirmation message or acknowledgment message to the first transceiver 24.

If the control unit 23 of the rechargeable battery 3 determines after a second predetermined period of time that no second signal was received from the second transceiver 26 of the power tool 2 at the first transceiver 24 of the rechargeable battery 3, the control unit 23 of the rechargeable battery 3 causes the rechargeable battery 3 to be adjusted from a first operating state (also called operating mode) to a second operating state. The first operating state can be an activation state and the second operating state can be a deactivation state. In the activation state, among other things, electrical energy is provided by the energy storage cells 21 of the rechargeable battery 3, with the result that the rechargeable battery 3 can supply the power tool 2 with electrical energy in a connected state. In the deactivation state, on the other hand, no electrical energy is provided by the rechargeable battery 3 and consequently the power tool 2 is no longer supplied with electrical energy either.

Alternatively or in addition to this, the control unit 23 of the rechargeable battery 3 causes a corresponding third signal to be sent from the first transceiver 24 of the rechargeable battery 3 to the second transceiver 26 of the power tool 2. The power tool 2 is switched from a first operating state to a second operating state by means of the control unit 10 by way of the third signal. The first operating state can be an activation state and the second operating state can be a deactivation state. In an activation state, among other things, a torque is generated by the drive 7 of the power tool 2 and in the deactivation state, on the other hand, no more torque is generated by the drive 7 of the power tool 2. Alternatively, the control unit 10 of the power tool 2 itself can also cause the power tool 2 to be switched from a first operating state (i.e. activation state) to a second deactivation state (i.e. deactivation state) if no first signal is received or no first signal is received in an error-free and complete manner by the first transceiver 24 of the rechargeable battery 3 after a predetermined period of time.

According to a further alternative embodiment, it may also be possible for the control unit 10 of the power tool 2 to send a corresponding signal from the second transceiver 26 to the first transceiver 24, as a result of which the control unit 23 switches the rechargeable battery 3 from a first operating state (i.e. activation state) to a second deactivation state (i.e. deactivation state).

According to a further alternative embodiment, it may also be possible for the control unit 10 of the power tool 2 to send a corresponding signal from the second transceiver 26 to the first transceiver 24, as a result of which the control unit 23 causes the first transceiver 24 to resend a first signal to the second transceiver 26.

Due to the fact that previously and apparently still only erroneous or incomplete signals have been sent from the rechargeable battery 3 to the power tool 2, it can be assumed that there is a malfunction or fault in the rechargeable battery 3. A reliable continuation of the supply of the power tool 2 with electrical energy by the rechargeable battery 3 is possibly no longer available.

As a consequence of this, the power tool 2 causes the power tool 2 to be adjusted either completely from an activation state to a deactivation state or partially from an activation state to a deactivation state.

When adjusted to a complete deactivation state, all functions of the power tool 2 are deactivated. In contrast to this, only certain functions of the power tool 2 are deactivated in a partial deactivation state.

As already described above, in the present exemplary embodiment and in the figures, the first participant with the first transceiver 24 implemented or configured by the rechargeable battery 3 and the second participant with the second transceiver 26 is implemented or configured by the power tool 2. It should also be understood in the sense of the present invention that the first participant with the first transceiver is implemented or configured by the power tool 2 and the second participant with the second transceiver 26 is implemented or configured by the rechargeable battery 3.

Alternatively, the first participant with the first transceiver 24 can be the rechargeable battery 3 and the second participant with the second transceiver can be a charging apparatus 106 for the rechargeable battery 3 as shown solely schematically in FIG. 3.

It is also possible for the first participant with the first transceiver to be implemented or configured by the charging apparatus and for the second participant with the second transceiver to be implemented or configured by the rechargeable battery 3.

LIST OF REFERENCE SIGNS

1 System
2 Power tool
3 Rechargeable battery
4 Housing of the power tool
5 Tool fitting
6 Handle
6a First end of the handle
6b Second end of the handle
7 Drive
8 Transmission apparatus
9 Driveshaft
10 Control unit
11 Tool
12 Base apparatus
13 Power-tool interface
14a Mechanical attachment component of the power tool
14b Mechanical attachment component of the rechargeable battery
15a Electrical connecting terminals of the power tool
15b Electrical connecting terminals of the rechargeable battery
16a First positive contact of the power tool
16b First positive contact of the rechargeable battery
17a Second positive contact of the power tool
17b Second positive contact of the rechargeable battery
18a First negative contact of the power tool
18b First negative contact of the rechargeable battery
19a Second negative contact of the power tool
19b Second negative contact of the rechargeable battery
20 Rechargeable battery housing
20a Front side of the rechargeable battery housing
20b Rear side of the rechargeable battery housing
20c Top side of the rechargeable battery housing
20d Underside of the rechargeable battery housing
20e Left-hand side wall of the rechargeable battery housing
20f Right-hand side wall of the rechargeable battery housing
21 Energy storage cell
22 Rechargeable-battery interface
23 Control unit
24 First transceiver
25 First communication element
26 Second transceiver
27 Second communication element
B1 First component of the signal
B2 Second component of the signal
S1 First storage device of the power tool
S2 Second storage device of the rechargeable battery

What is claimed is:

1. A method for communicating between a first participant with a first transceiver and a second participant with a second transceiver, wherein the first participant is in the form of a rechargeable battery and the second participant is in the form of a power tool or a charging apparatus and wherein the rechargeable battery is selectively releasably connected to the power tool or the charging apparatus, the method comprising:

transmitting at least one first signal from the first transceiver to the second transceiver, wherein the signal contains at least one first component of a data set and one second component of a data set;

transmitting a second signal from the second transceiver to the first transceiver when, after determining a checksum, no error can be detected in the first component of the first transmitted and received signal;

transmitting the first signal from the first transceiver to the second transceiver when no second signal is received by the first transceiver after expiry of a first predetermined period of time; and adjusting the first participant from a first operating state to a second operating state or transmitting a third signal from the first transceiver to the second transceiver in order to adjust the second participant from the first operating state to the second operating state when no first signal is received by the second transceiver after a second predetermined period of time or when no second signal is received by the first transceiver after a third predetermined period of time.

2. The method for communication as recites in claim 1 wherein the checksum is determined by a cyclic redundancy.

3. The method for communication as recited in claim 1 wherein the first component of the data set is in the form of useful data and the second component of the data set is in the form of redundancy.

4. The method for communication as recited in claim 1 wherein the first operating state is an activation mode and the second operating state is a deactivation mode.

5. A system for carrying out a method for communicating between a first and a second participant recited in claim 1, wherein the first participant contains a control unit and at least one first transceiver and the second participant contains a control unit and at least one second transceiver, wherein signals can be transmitted between the first and second transceivers in a connected state.

6. The system as recited in claim 5 wherein communication between the first and second participants is based on a wireless data transmission technology.

7. The system as recited in claim 5 wherein the communication between the first and second participants is based on a wired data transmission technology.

8. The system as recited in claim 5 wherein the first participant is in the form of a rechargeable battery and the second participant is in the form of a power tool supplied with electrical energy by the rechargeable battery.

9. The system as recited in claim 5 wherein the first participant is in the form of a rechargeable battery and the second participant is in the form of a charging apparatus for supplying the rechargeable battery with electrical energy.

10. The method for communication as recited in claim 1 wherein when no first signal is received by the second transceiver after the second predetermined period of time, the first participant is adjusted from the first operating state to the second operating state.

11. The method for communication as recited in claim 1 wherein when no first signal is received by the second transceiver after the second predetermined period of time, the third signal from the first transceiver to the second transceiver is transmitted in order to adjust the second participant from the first operating state to the second operating.

12. The method for communication as recited in claim 1 wherein when no second signal is received by the first transceiver after the third predetermined period of time, the first participant is adjusted from the first operating state to the second operating state.

13. The method for communication as recited in claim 1 wherein when no second signal is received by the first transceiver after the third predetermined period of time, the third signal from the first transceiver to the second transceiver is transmitted in order to adjust the second participant from the first operating state to the second operating.

* * * * *